Dec. 13, 1932.   F. M. GRAHAM ET AL   1,890,605
RAIL LUBRICATING DEVICE
Filed March 31, 1930
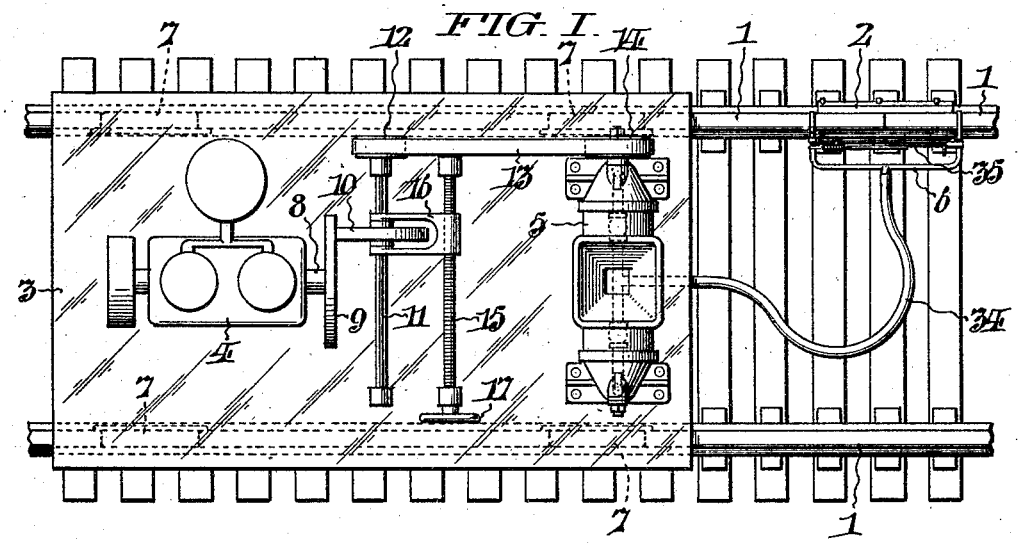
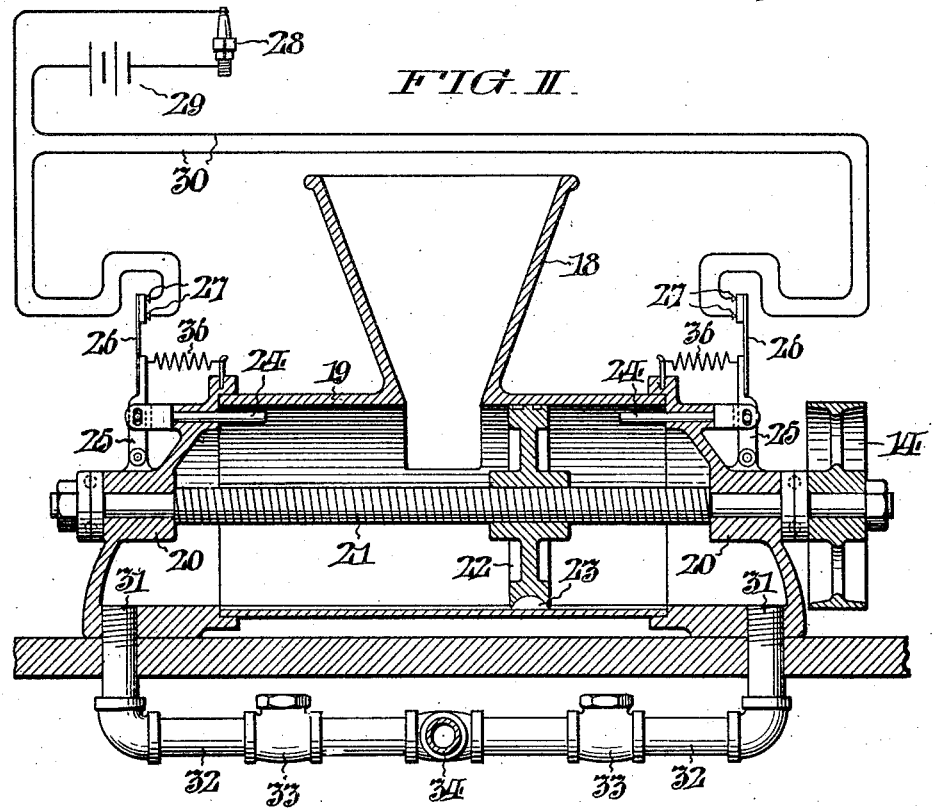
WITNESSES
John A. Weidler
George M. Murchaup
INVENTOR:
Frederick M. Graham &
James B. McWilliams,
BY
ATTORNEYS Patented Dec. 13, 1932

1,890,605

UNITED STATES PATENT OFFICE

FREDERICK M. GRAHAM, OF HOLLIDAYSBURG, AND JAMES B. McWILLIAMS, OF PITTSBURGH, PENNSYLVANIA

RAIL LUBRICATING DEVICE

Application filed March 31, 1930. Serial No. 440,265.

This invention relates to apparatus primarily adapted for lubricating rail joints of railway track.

It has heretofore been proposed to supply lubricant to the areas between joint bars and the abutting ends of rails for the purpose of reducing track noises and wear, and to maintain freedom of movement between rails and joint bars, thus permitting expansion and contraction of the rails incident to temperature changes. Such methods have involved, for example, the use of pre-formed or molded strips of packing material composed of an absorbent base impregnated with a lubricant, the packing strip being adapted to fill the areas between the rail webs and joint bars.

One object of our invention is to dispense with the expensive and laborious operation of replacing lubricant packing by removal of the joint bars, and to substitute therefor a movable rail lubricating unit adapted for attachment to successive rail joint bars and including pumping means for forcing a lubricant of the consistency of a thick grease under pressure into the areas between adjacent rail ends and the joint bars by which the rails are connected. For this purpose, we preferably provide a lubricant which is capable of being forced under pressure into small apertures and yet sufficiently viscous so that the lubricant will remain in the joint for a considerable period of time.

A further object of the invention consists in the provision of a pump and means associated therewith, all comprising a part of a movable unit, particularly adapted to deliver a measured quantity of lubricant at each actuation, whereby the lubricating unit may be quickly moved from one rail joint to another, and a charge of the proper amount of lubricant injected into the successive joint bars as the unit is progressed along the track.

Other objects and advantages to be attained with the use of our invention will be apparent from the detailed description of a preferred embodiment thereof which follows, and which has reference to the accompanying drawing.

Of the drawing:

Fig. I represents a plan view of a rail lubricating unit embodying our invention; and, Fig. II represents an enlarged cross-sectional view of the pump which forms an element of the rail lubricating unit.

With particular reference to Fig. I, there is shown a short length of track with rails 1 connected by a joint bar 2. Such joints are commonly staggered along the track, and, accordingly, the lubricating unit hereinafter described is particularly adapted to be successively applied first to a rail joint at one side of the track and then to a rail joint at the other side.

The lubricating unit comprises generally a movable truck 3, an engine 4, and pump 5 mounted on the truck, and a flexible discharge connection 6 adapted for attachment to the rail joint bars. The truck 3 is supported on wheels 7 and is, in the instance shown, equipped with a gasolene engine 4, which is adapted to drive either the truck itself or the pump 5. The engine shaft 8 is provided with a friction disk 9 which engages a similar disk 10 mounted on the auxiliary shaft 11. A pulley 12 on the shaft 11 serves as the driving element which, by means of a belt 13, drives the pump shaft pulley 14.

Speed and directional changes of the driving pulley 12 are effected by lateral movement of the disk 10 with respect to the shaft 11 to which it is splined. This lateral movement of the disk 10 is accomplished by means of a threaded shaft 15 and disk carrier 16 which includes a part in the form of a nut on the shaft 15. In an obvious manner the turning of a hand wheel 17 on the shaft 15 serves to vary the relative position of the friction disks 9 and 10 to reverse the direction or change the speed of the driving pulley 12.

With particular reference to Fig. II, the pump 5 comprises generally a hopper 18 and a pump chamber 19 of a size to accommodate a charge of lubricant sufficient to fill one rail joint. Mounted in bearings 20 at opposed ends of the pump chamber is a threaded shaft 21 driven by the pulley 14. The piston 22 is cooperatively threaded with the shaft 21 and adapted to travel back and forth in the pump chamber 19, rotative movement of the piston 22 being prevented by means of a key 23. At each end of the pump chamber 19 we provide automatic means for stopping the travel of the piston beyond a predetermined point. Such means preferably comprise a plunger 24 pivoted to a lever 25 carrying a movable contact 26. The movable contact 26 is normally held in engagement with stationary contacts 27, by means of a spring 36, but upon the outward movement of the plunger 24 occasioned by the travel of the piston 22, the contacts are broken. When either set of contacts are broken the ignition circuit of the engine 4 is interrupted. This circuit is diagrammatically illustrated as comprising a spark plug 28, a battery 29 and wires 30.

Discharge ports 31 are provided at the ends of the pump chamber 19, both of these ports being connected through a pipe 32 equipped with one-way valves 33 with a flexible discharge tube 34. The flexible tube 34 terminates in the attachment 6, which is shown clipped to a joint bar 2 to seal the spaces at the ends thereof, by means of a toggle joint 35. The lubricant is admitted to the rail joint at opposite ends of the joint bar 2 in the manner described in the co-pending application for U. S. Letters Patent of Frederick M. Graham, Serial No. 440,266, filed March 31, 1930, which is directed to the type of rail joint attachment preferably used with our invention.

The operation of the apparatus will be apparent from the description herein of its component parts. The rail lubricating unit is propelled along the track, the operator stopping at each rail joint to be lubricated. When the joint bar attachment has been secured in place, the engine is operated by means of the friction clutch to drive the pump piston and discharge the lubricant from the piston chamber, thus delivering the proper quantity of lubricant to the joint. The hopper 18 is then filled with another charge, the engine is reversed, and the operation repeated at the next rail joint. By means of the electrical contacts 26 and 27 the pump is automatically stopped after each operation thereof, thus giving the operator time to move the truck along the rail and to prepare for the filling of the next joint bar.

While our invention has been described in some detail with reference to a specific embodiment thereof, it will be readily apparent that various changes may be made in the form of the apparatus described without departing from the spirit of the invention as defined in the claim hereto annexed.

Having thus described our invention, we claim:

A device for injecting a measured quantity of a lubricant of the consistency of a thick grease into the space between a joint bar and the rails comprising a truck adapted to be moved along the track; a pump mounted on said truck, said pump including a piston, means for automatically stopping the travel of said piston upon the delivery of a measured quantity of said lubricant, and means for thereafter reversing the travel of said piston; and a discharge connection on said pump having an attachment with means thereon adapted to embrace opposite ends of a joint bar to seal the ends of the rail joint space aforesaid against the delivery pressure of the lubricant injected therein.

In testimony whereof, we have hereunto signed our names.

FREDERICK M. GRAHAM.
JAMES B. McWILLIAMS.